(12) United States Patent
Milleker et al.

(10) Patent No.: US 7,072,903 B2
(45) Date of Patent: Jul. 4, 2006

(54) SYSTEM AND METHOD FOR TRANSLATING TO AND FROM HIERARCHICAL INFORMATION SYSTEMS

(75) Inventors: William N. Milleker, Riverside, IL (US); Dhananjay M. Joshi, Wilmette, IL (US); Jay Phillips, Chicago, IL (US); Morrisha L. Hudgons, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 489 days.

(21) Appl. No.: 10/327,622

(22) Filed: Dec. 20, 2002

(65) Prior Publication Data

US 2003/0220930 A1 Nov. 27, 2003

Related U.S. Application Data

(63) Continuation of application No. 09/479,840, filed on Jan. 7, 2000, now Pat. No. 6,523,042.

(51) Int. Cl.
*G06F 17/30* (2006.01)

(52) U.S. Cl. ............... 707/102; 707/1; 707/2; 707/4; 707/203; 707/205

(58) Field of Classification Search ............ 707/10, 707/100, 101, 102, 103, 1, 2, 4, 203, 205; 709/223

See application file for complete search history.

(56) References Cited

U.S. PATENT DOCUMENTS

| | | | |
|---|---|---|---|
| 5,331,579 A | 7/1994 | Maguire et al. | |
| 5,613,122 A | 3/1997 | Burnard et al. | |
| 5,630,131 A | 5/1997 | Palevich et al. | |
| 5,642,511 A | 6/1997 | Chow et al. | |
| 5,655,118 A | 8/1997 | Heindel et al. | |
| 5,664,177 A | 9/1997 | Lowry | |
| 5,708,828 A | 1/1998 | Coleman | |
| 5,737,559 A | 4/1998 | Orton et al. | |
| 5,812,995 A | 9/1998 | Sasaki et al. | |
| 5,838,965 A | 11/1998 | Kavanagh et al. | |
| 5,842,213 A | 11/1998 | Odom et al. | |
| 5,945,992 A | 8/1999 | Cunniff | |
| 5,963,939 A * | 10/1999 | McCann et al. | ............... 707/4 |
| 5,970,490 A | 10/1999 | Morgenstern | |
| 6,529,953 B1 * | 3/2003 | Van Renesse | ............... 709/223 |

OTHER PUBLICATIONS

Blattner, Meera M. and Kou, Lawrence T., "A User Interface for Computer-Based Message Translation," *System Sciences*, 1989, vol. IV: Emerging Technologies and Applications Track, Proceedings of 22nd Annual Hawaii International Conference, Kailua-Kona, Hawaii, Jan. 3-6, 1989, Washington, D.C., USA, Jan. 3, 1989, IEEE Comput. Soc. Pr., pp. 43-51.

(Continued)

*Primary Examiner*—Thuy N. Pardo
(74) *Attorney, Agent, or Firm*—Brinks Hofer Gilson & Lione

(57) ABSTRACT

A method for translating to and from an hierarchical information system, comprises identifying a non-hierarchical information system containing information stored in a non-hierarchical manner; developing a translation map that identifies organizational and content based rules for translating the non-hierarchical information into an hierarchical information system; and translating the non-hierarchical information for storage into the hierarchical information system according to the rules for translating.

40 Claims, 3 Drawing Sheets

OTHER PUBLICATIONS

Flint, E.S., "The COBOL jigsaw puzzle: Fitting object-oriented and legacy applications together," *IBM Systems Journal*, vol. 36, No. 1, 1997, Armonk, NY, pp. 49-65.

Lyons, Bob, "Coverting Flat File Content into XML and Vice Versa," XML 99 Conference, Dec. 5-9, 1999, Philadelphia, PA, http://www.infoloom.com/gcaconfs/WEB/philadelphia99/lyons.HTM>, pp. 1-12.

Noffsinger, W.B., Niedbalski, Robert, Blanks, Michael, and Emmart, Niall, "Legacy Object Modeling Speeds Software Integration," *Communications of the ACM*, Dec. 1998, vol. 41, No. 12, pp. 80-89.

Roy, Mark, "Business Objects and Legacy Integration," *Object Magazine*, vol. 7, No. 8, Oct. 1997, pp. 20-22.

Using the MQSeries Integrator Version 1.0 dated May 1999, Wackerow et al. (205 pages).

IBM Opens MQSeries with XML http://www.techweb.com/wire/story/TWB19990614S0016 dated Jun. 14, 1999, Booker (3 pages).

IBM bolsters MQSeries with Java and XML http://www.nwfusion.com/news/1999/0615java2.html dated Jun. 15, 1999, Cox (6 pages).

* cited by examiner

SYSTEM AND METHOD FOR TRANSLATING TO AND FROM HIERARCHICAL INFORMATION SYSTEMS

This application is a continuation of application Ser. No. 09/479,840, filed Jan. 7, 2000, now U.S. Pat. No. 6,523,042, which is hereby incorporated by reference herein.

COPYRIGHT REFERENCE

Two Appendixes are included in this application that contain material which is subject to copyright protection. The copyright owner has no objection to the facsimile reproduction by anyone of the Appendixes, as it appears in the Patent and Trademark Office patent files or records, but otherwise reserves all copyright rights whatsoever.

BACKGROUND OF THE INVENTION

The present invention relates to a system and method for translating information, to or from, an hierarchical information system.

Legacy systems are systems that support business function, many of which have been in use for many years. These systems usually store information, and communicate with each other, using non-hierarchical information systems, such as linear strings (i.e. legacy messages).

Modern systems often use an hierarchical system to store information and communicate with each other. Hierarchical system typically store information in a tree structure of objects, each object having specific attributes, and where each object may be linked to other objects. XML (Extensible Markup Language) is an example of an hierarchical system.

The need arises for an interface to translate information between systems. Simple systems that translate between linear strings are well known. However, there is a need for products that can read the objects of an hierarchical system and perform the required data transformations. MERCATOR, for example, could be used if first the object model were translated into a standard, predictable data stream. However, the effort to translate the object model into this intermediate format is similar to the effort required to translate the object model into a form directly usable by the legacy system. In addition, MERCATOR is implemented as a single-threaded DLL (Dynamic Linked Library) in Windows NT, which may have an adverse impact on overall system performance and throughput.

BRIEF SUMMARY OF THE INVENTION

A first aspect of the invention is a method for translating to and from an hierarchical information system, comprising identifying a non-hierarchical information system containing information stored in a non-hierarchical manner; developing a translation map that identifies organizational and content based rules for translating the non-hierarchical information into an hierarchical information system; and translating the non-hierarchical information for storage into the hierarchical information system according to the rules for translating.

A second aspect of the invention is computerized method for translating to and from an hierarchical information system.

A third aspect of the invention is a system for translating to and from an hierarchical information system, comprising means for identifying a non-hierarchical information system containing information stored in a non-hierarchical manner; means for developing a translation map that identifies organizational and content based rules for translating the non-hierarchical information into an hierarchical information system; and means for translating the non-hierarchical information for storage into the hierarchical information system according to the rules for translating.

A fourth aspect of the invention is a system for translating to and from an hierarchical information system, comprising a first computer system having a memory for storing information in an hierarchical information system; an interface coupled to the first computer system, the interface having means for identifying a non-hierarchical information system containing information stored in a non-hierarchical manner, developing a translation map that identifies organizational and content based rules for translating the non-hierarchical information into an hierarchical information system, and translating the non-hierarchical information for storage into the hierarchical information system according to the rules for translating; and a second computer system coupled to the interface, the second computer system having a memory for storing information in a non-hierarchical information system.

A fifth aspect of the invention is a method for translating to and from an hierarchical information system, comprising translating data from an object model into a legacy message.

A sixth aspect of the invention is a method for translating to and from an hierarchical information system, comprising translating data from a legacy message model into an object.

A seventh aspect of the invention is a method for translating to and from an hierarchical information system, comprising identifying an hierarchical information system containing information stored in an hierarchical manner; developing a translation map that identifies organizational and content based rules for translating the hierarchical information into an non-hierarchical information system; and translating the hierarchical information for storage into the non-hierarchical information system according to the rules for translating.

An eighth aspect of the invention is a computerized method for translating to and from an hierarchical information system, comprising identifying an hierarchical information system containing information stored in an hierarchical manner; developing a translation map that identifies organizational and content based rules for translating the hierarchical information into an non-hierarchical information system; and translating the hierarchical information for storage into the non-hierarchical information system according to the rules for translating.

A ninth aspect of the invention is a system for translating to and from an hierarchical information system, comprising means for identifying an hierarchical information system containing information stored in an hierarchical manner; means for developing a translation map that identifies organizational and content based rules for translating the hierarchical information into a non-hierarchical information system; and means for translating the hierarchical information for storage into the non-hierarchical information system according to the rules for translating.

A tenth aspect of the invention is a system for translating to and from an hierarchical information system, comprising a first computer system having a memory for storing information in a non-hierarchical information system; an interface coupled to the first computer system, the interface having means for identifying an hierarchical information system containing information stored in an hierarchical manner, developing a translation map that identifies organizational and content based rules for translating the hierarchical information into a non-hierarchical information system, and translating the hierarchical information for storage into the non-hierarchical information system according to the rules for translating; and a second computer system coupled to the interface, the second computer system having a memory for storing information in an hierarchical information system.

BRIEF DESCRIPTION OF THE DRAWINGS

These and other features and advantages of the invention will become apparent upon a review of the following detailed description of the presently preferred embodiments of the invention, when viewed in conjunction with the appended drawings.

DETAILED DESCRIPTION OF THE INVENTION

The present invention includes an interface that supports the specific data transformation requirements of translating information from a specific hierarchical system (also referred to as an object model), such as XML data, into a non-hierarchical system, such as linear strings (i.e., custom legacy messages), or into a different specific hierarchical system. The interface performs the mapping, lookups and derivations necessary to format legacy messages in a manner consistent with the legacy applications.

Figure 1:
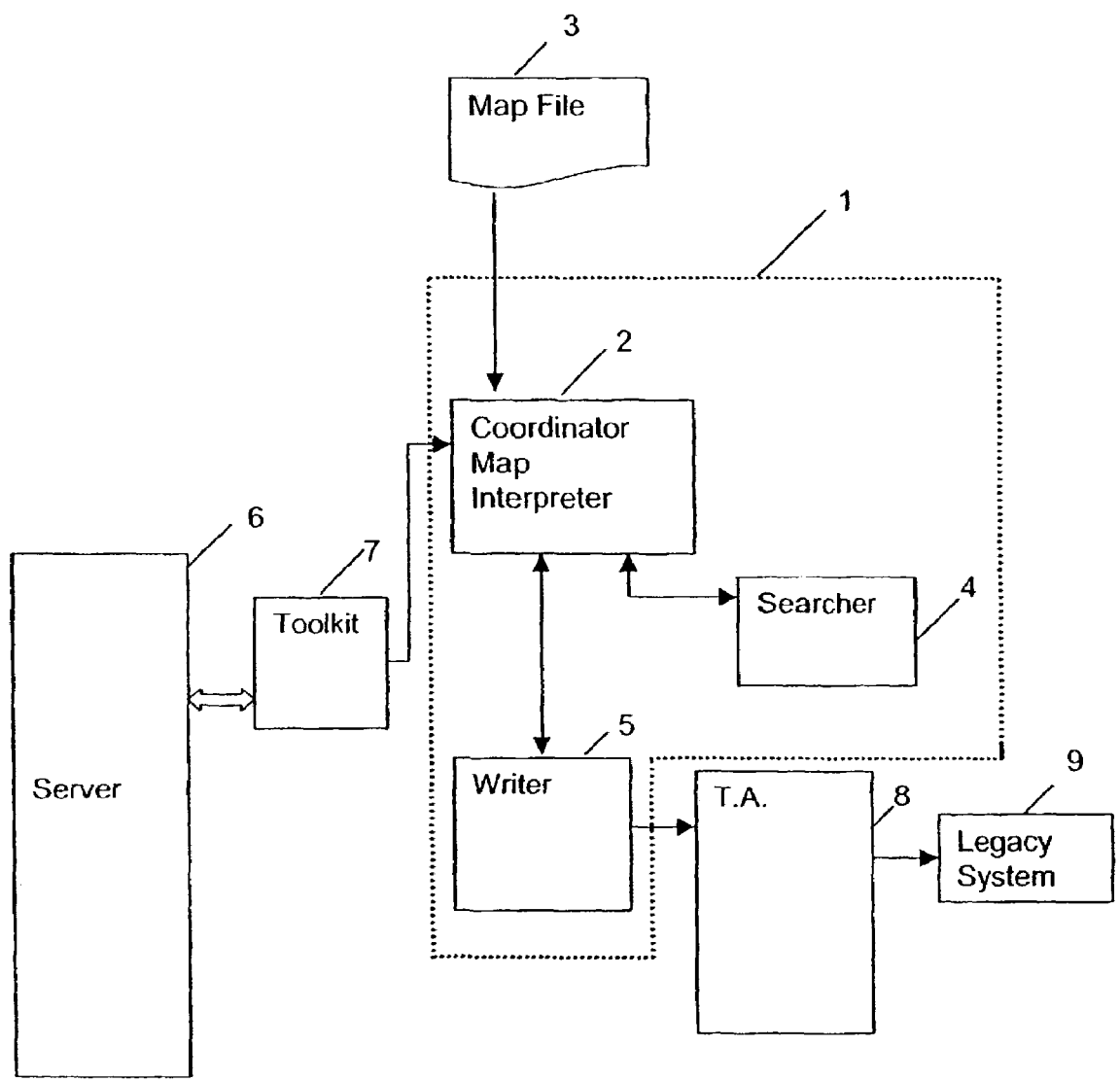
FIG. 1 shows the application architecture and components of an interface.
Figure 2:
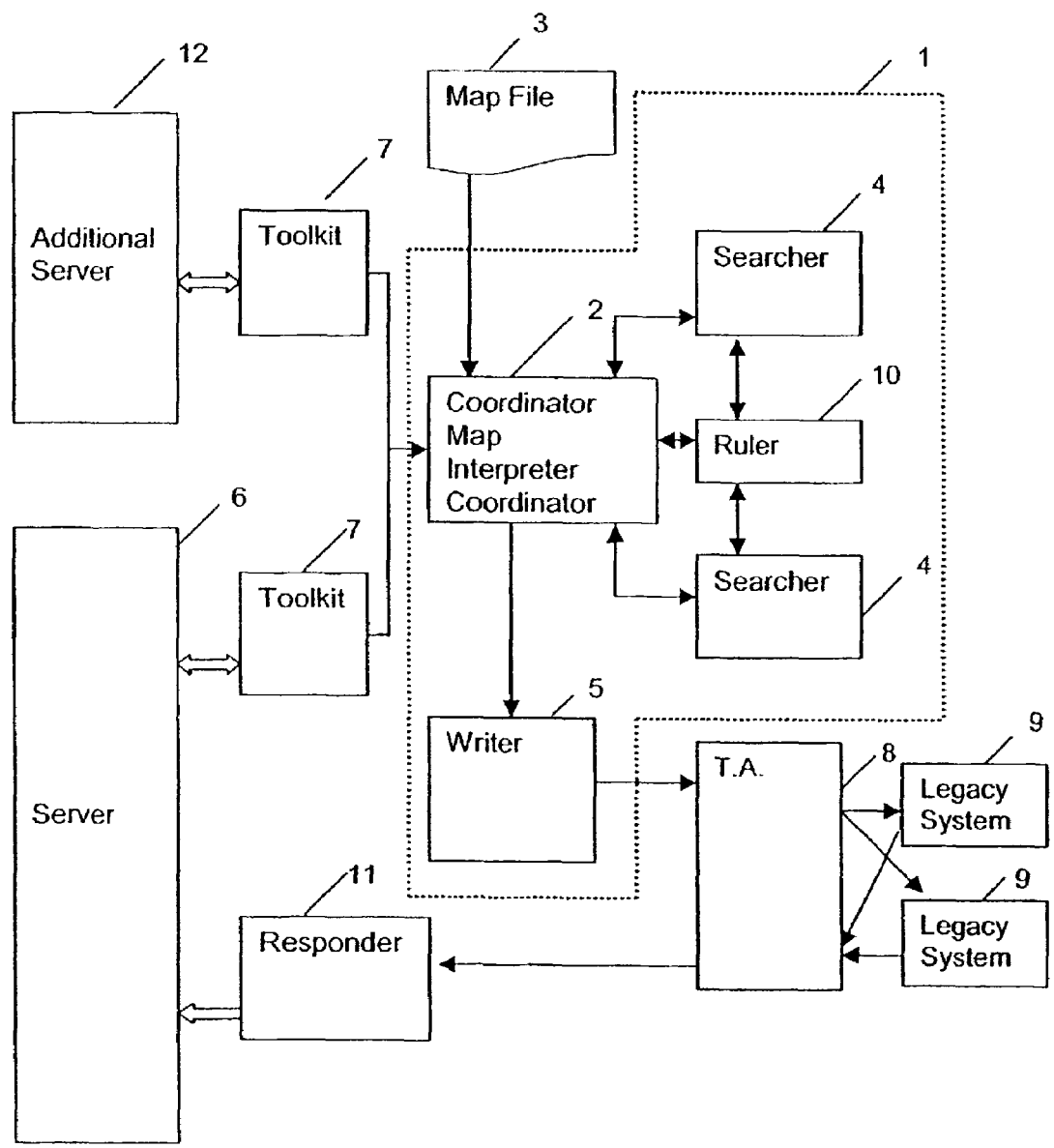
FIG. 2 shows the application architecture and components of another interface.

The application architecture and components of the interface are shown in FIG. 1. The components, and additional optional components, are shown in FIG. 2. As will be apparent to those of ordinary skill in the art, the interface may be software implemented on a general purpose computer, or may be dedicated hardware, or a combination thereof. Furthermore each individual component may be software implemented on a general purpose computer, or may be dedicated hardware, or a combination thereof. All components of the interface are described first, followed by a section describing the application flow. A subsequent section includes a summary of the data transformations supported by the interface.

As schematically shown in FIG. 1, the interface 1 includes a coordinator 2, a searcher 4, and a writer 5. Also shown in the figure are a map file 3, a toolkit 7, a technical architecture framework 8, a legacy system 9, and a server 6.

In addition to those parts shown in FIG. 1, FIG. 2 schematically shows another server 12 that may use a different object model, a toolkit 7' for this different object model, a searcher 4' for this different object model, a second legacy system 9, a ruler 10, and a responder 11.

The map file defines the attributes that are to be obtained from the object or IDL (interface definition language) structure and used in the construction of legacy messages. The map file defines the attribute location (in each object in the object model), the format of the attribute values as they should appear in the legacy message, and the order in which the attribute values should appear in the legacy message. The map file may be viewed as a series of commands, which instruct the coordinator on how to construct the legacy message from the objects.

The coordinator controls the process of reading the map file and using the searcher and optional ruler to obtain information to send to the writer. The coordinator orchestrates the translation, resolution, derivation, message construction, and message delivery processes. The coordinator includes a map interpreter, which interprets the commands in the map file. Preferably the coordinator is developed using JAVACC, a SUN MICROSYSTEMS product. Given a grammar that describes the syntax used in the map file, JAVACC can be used to create the coordinator and allow map files to contain commands that access the searcher, ruler and writer.

The searcher provides an interface that is used by the coordinator and the ruler to obtain attribute information within each object. The coordinator uses commands from the map file to translate data (attributes) from an object model to the legacy system attributes. The coordinator executes rules as they are read from the map file. The coordinator uses the searcher to locate attributes used in a command. For example, if a command requires a calculation using attributes in an object, the coordinator would use the searcher to obtain these attributes and perform the calculation.

The writer formats attributes passed by the coordinator and uses them to the construct the message that is sent to the legacy system.

The optional responder returns confirmations from the legacy system to the system that initiated the transaction. If the initiating system is a server, the responder converts the legacy response to an XML message. For example, systems using the IDL interface will receive responses in the form of IDL structures.

The following is an example of how the system shown in FIG. 2 may operate. A request is made of the interface via a CORBA IDL interface. Upon receipt of the request, the interface creates a new coordinator passing either the XML string or the IDL defined structure, and starts the coordinator.

The coordinator creates a new searcher, passing in the object model to be searched. The coordinator creates a new ruler, passing in the previously created searcher. The ruler will use the searcher if necessary during execution of its rules.

The coordinator then requests the target system identifier (e.g. legacy system) of the searcher. The coordinator will create a new writer, passing the target system identifier. The target system identifier is required so that the writer deposits the constructed message on the appropriate legacy queue.

The coordinator requests the map file of the map loader. If the map loader has the requested map file cached, the memory-resident map file is returned to the coordinator. If the map is not loaded, the map loader loads it and returns it to the coordinator. The map loader is an optional component that only carries out this function, and advantageously prevents the need to reload map files that have been previously loaded.

The coordinator (via the map interpreter) reads the map file and determines that an attribute from an object model is needed. The coordinator (via the map interpreter) makes a request of the searcher to get the needed attribute information. The searcher finds and returns the requested attribute.

The coordinator (via the map interpreter) tells the writer to add the obtained attribute information to the message under construction. The writer formats the attribute information as defined by the map file and then appends the formatted attribute to the message under construction.

The coordinator reads the map file and may encounter a command that invokes a rule. In this case, the coordinator makes a request of the ruler to execute the specified rule. The ruler makes a request of the searcher to get, if necessary, attribute information needed during execution of the rule. The searcher finds and returns the requested attribute. The coordinator tells the writer to add the obtained attribute information to the message under construction. The writer formats the attribute information as defined by the map file and then appends the formatted attribute to the message under construction.

At the end of the map file, the coordinator tells the writer to complete the message under construction and to send it to the appropriate legacy system. The writer makes a request of the technical architecture (also referred to as an underlying architecture) to package the message, for example, as a queued message (for IBM MQ Series, or MICROSOFT MSMQ), and deposit it on the appropriate legacy system queue. The technical architecture creates a new message using the application-defined message content and deposits the message on the appropriate legacy queue.

In a preferred embodiment, the memory address of each object is retained as a legacy message is constructed, reducing the time necessary for the reading of additional attributes needed to construct the legacy message.

Figure 3:
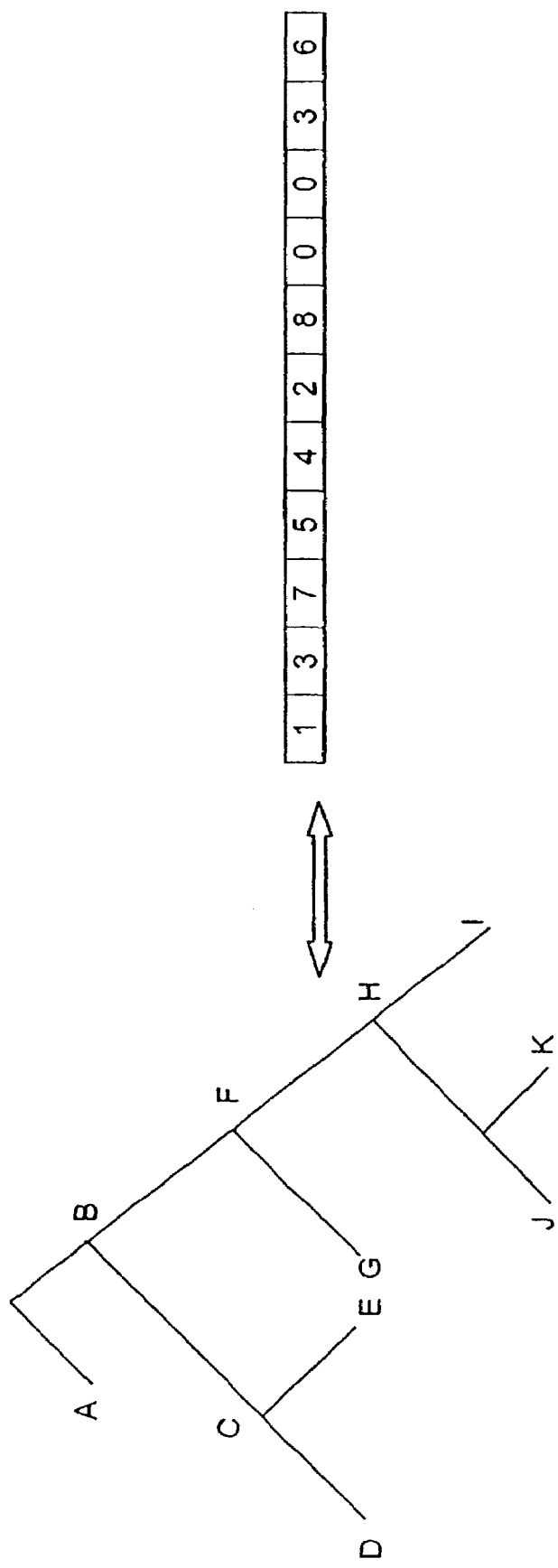
FIG. 3 is an illustration showing the transformation of attributes from an hierarchical system to a non-hierarchical system, and the reverse.

FIG. 3 is an illustration showing the transformation of attributes (data) from an hierarchical system (left) to a non-hierarchical system (right), which in this illustration is a linear string. The individual attributes of the objects in the hierarchical system are represented by letters, while attributes in the linear string are represented by numbers. The interface can read the attributes of the objects, and translate them (from letters to number in this illustration), and write them into a linear string. The linear string may then be passed to a legacy system. As illustrated, the reverse is also possible.

Once the message has been processed by the legacy system, an optional response is returned to the technical architecture via a message queue. The technical architecture retrieves the message from the queue and creates an optional responder. The technical architecture passes the data portion of the message to the responder and instructs the responder to execute the process of returning the response.

The responder creates an object and populates the object with data (attributes) expected by the server. This data includes attributes such as a group identifier that is generated by the legacy system, for example group enrollment of an insurance plan. In the case where the object model is XML, once the object has been populated, the responder creates an XML message. The responder queries the Proxy Pool Manager for a secure proxy to the appropriate server. The responder then uses the secure proxy to send the XML message response to the server.

If, after a predefined number of tries, the proxy cannot be used to send the results to the server, a return code is passed back to the technical architecture and the message is sent to a resend queue to be delivered at a later time. Once the response has been successfully delivered to the server, a return code is passed back to the technical architecture and the message is deleted from the queue.

The application architecture is designed to handle the following categories of data transformations: simple mapping, constants, code lookups, derived rule, multiple source locations (plan modeling), and rate information fields (when the data contains information relating to a service, such as insurance).

Simple mapping means mapping fields that can be mapped directly from an object attribute to a legacy message field without any additional mapping logic.

Constants are fields in the legacy message that are required and are always populated with the same information. For example, a field that describes the type of transaction would always contain an 'E' for electronic since the framework is an electronic means of creating the message.

Code lookups are fields that require a translation from how an attribute is described in the hierarchical system, and how the same attribute is described in a legacy message.

A derived rule is a field that is extracted from the object model and translated to the legacy message fields based on rules (such as business rules) as defined in the ruler.

Multiple source locations are fields that involve the same process of a simple map. However, the source attribute may be located in different areas of the Vendor object model.

Rate information fields are fields that are a specialized form of derivation rules that use name/value pairs. Unlike basic derived fields that rely on class names to find attributes in the object model, data values are used to search for rate attributes in the object model.

The map file contains commands, which are defined in the order that the legacy message needs to be constructed. The following are examples of the script used for the different categories of data translations contained in a map file:

Simple Mapping:
    write (search (case.member:CompanyName), "s30");
    write (search (case.member:SubscriberNumber), "s9");
    write (search (case.application:Deposit), "s10");
    write (search (case.application:SubjectToErisa), "s1");
    write (search (case: CaseInstallationID), "s20");

Use of Constants:
    write (" ", "s5");
    write ("00000", "s5");
    write ("H", "s1");
    write ("999999", "s6");
    write ("01", "s2");

Value Lookup:
    table trans_table {
      "1", "0"; // None
      "2", "1"; // Life
      "3", "3"; // Health
      "4", "2"; // Both
      default, "*";
    };
    string sval, lval;
    sval = search (case.caseinstallation:RetiredCoverageType);
    lval = lookup (trans_table, sval);
    write (lval, "s1");
    release (trans_table);

Derived Values:
    if (search (case:PriorEffectiveDateCoverage) =="")
      sval = "N";
    else
      sval = "Y";
    write (sval, "s1");

Occurrences:
    int i, j;
    i = count (case.member);
    j = 1;
    while (j <= 1)
    {
      write (search(case.member(j):City), "s15");
      write (search(case.member(j):State), "s2");
      j = j + 1;
    }

Other Operations:
    //specialrule7 is defined in the Business Ruler class
    write (ruler (specialrule7)),"s30");
    i = stringlength (sval);
    lval = midstring (sval, pos, length);
    i = tointeger (sval);

The data from hierarchical information system may be sent to the interface from a specific vendor's server, where the vendor may be the same or different from the owner or user of the legacy system. Furthermore, multiple vendors, each having one or more servers, each containing data in one or more hierarchical systems, may send data to the interface. The interface may translate the data into a non-hierarchical system, such as a legacy system, or a different hierarchical system. Examples of hierarchical systems include XML and ChannelPoint (CP XML).

Specifically, the interface may carry out one or more of the following:

Retrieve values (data) from Vendor object model, using the Vendor toolkit (note: this model is not static between invocations).

Concurrently support a different, dynamic map file for each legacy system output format.

Support simultaneous access from server components.

A toolkit is used to interpret the hierarchical system data exported from a server to the interface. Each toolkit may be specific to each hierarchical system, for example the MICROSOFT XML toolkit is specific to XML. On receipt of the exported hierarchical system data stream, the toolkit creates a copy of the original object (or objects). Data is then read out of this object (or objects) for translation into a custom legacy message.

The present invention interface has a number of advantages:

Adaptability to different legacy systems, including future systems.

Extensibility to other applications requiring access to legacy systems.

Maintainability and streamlined operational capability.

Scalability to handle production-level volume requirements.

Performance requirements to support multiple servers, using multiple Vendors.

Re-usability to reduce complexity and implementation timeline.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

The invention claimed is:

1. A system for translating from a non-hierarchical information system to a hierarchical information system, the system comprising logic for:

providing a translation map that identifies organization and content based rules for translating information from the non-hierarchical information system to the hierarchical information system based on at least one attribute;

receiving non-hierarchical information;

determining attribute information from the non-hierarchical information based on the translation map; and translating the attribute information to create hierarchical information based on the translation map by modifying the attribute information and adding the modified attribute information to a message under construction.

2. The system of claim 1, wherein the translation map defines location of the attribute in the non-hierarchical information; and wherein the logic for determining attribute information comprises logic for searching the location in the non-hierarchical information to determine the attribute information.

3. The system of claim 1, wherein the translation map comprises a rule; and wherein the logic for determining attribute information comprises logic for searching the non-hierarchical information for attribute information during execution of the rule.

4. The system of claim 1, wherein the translation map defines format of the attribute in the hierarchical information; and wherein the logic for modifying the attribute information comprises logic for formatting the attribute information based on the format of the attribute in the translation map.

5. The system of claim 1, wherein the logic for translating the attribute comprises logic for performing a calculation based on the attribute information.

6. The system of claim 1, wherein the logic for modifying the attribute information comprises logic for formatting the attribute information based on the translation map and appending the formatted attribute to the message under construction.

7. The system of claim 1, further comprising logic for:

providing a second translation map from a hierarchical information system to a non-hierarchical information system based on at least one attribute;

receiving a hierarchical message;

determining second attribute information from the hierarchical message based on the second translation map; and translating the second attribute information to create a non-hierarchical message based on the second translation map.

8. The system of claim 1, wherein the non-hierarchical information system comprises a non-XML system and wherein the hierarchical information system comprises an XML system.

9. A system for translating from a hierarchical information system to a non-hierarchical information system, the system comprising logic for:

providing a translation map that identifies organization and content based rules for translating information from the hierarchical information system to the non-hierarchical information system based on at least one attribute;

receiving hierarchical information;

determining attribute information from the hierarchical information based on the translation map; and translating the attribute information to create non-hierarchical information based on the translation map by modifying the attribute information and adding the modified attribute information to a message under construction.

10. The system of claim 9, wherein the translation map defines location of the attribute in the hierarchical information; and wherein the logic for determining the attribute information comprises logic for searching the location in the hierarchical information to determine the attribute information.

11. The system of claim 9, wherein the translation map comprises a rule; and wherein the logic for determining attribute information comprises logic for searching the hierarchical information for attribute information during execution of the rule.

12. The system of claim 9, wherein the translation map defines format of the attribute in the non-hierarchical information; and
   wherein the logic for modifying the attribute information comprises logic for formatting the attribute information based on the format of the attribute in the translation map.

13. The system of claim 9, wherein translating the attribute comprises performing a calculation based on the attribute information.

14. The system of claim 9, wherein the logic for modifying the attribute information comprises logic for formatting the attribute information based on the translation map and appending the formatted attribute to the message under construction.

15. The system of claim 9, wherein the logic for translating the attribute information comprises logic for mapping the attribute information to the non-hierarchical information.

16. The system of claim 9, further comprising logic for inserting constants in the non-hierarchical information.

17. The system of claim 9, wherein the non-hierarchical information system comprises a non-XML system and wherein the hierarchical information system comprises an XML system.

18. A method of translating between XML and non-XML information systems comprising:
   providing a first translation map that identifies organization and content based rules for translating information from a non-XML information system to an XML information system based on at least one attribute;
   providing a second translation map that identifies organization and content based rules for translating information from an XML information system to at least one non-XML information system based on at least one attribute;
   receiving non-XML information;
   determining non-XML attribute information from the non-XML information based on the first translation map;
   translating the non-XML attribute information to create XML information based on the first translation map;
   determining, between at least two non-XML information systems, which non-XML information system to send a message;
   determining XML attribute information from the XML information based on the second translation map;
   creating non-XML message by translating the XML attribute information using the second translation map; and
   sending the non-XML message to the determined non-XML information system.

19. The method of claim 18, wherein translating the non-XML attribute information to create XML information based on the first translation map comprises modifying the non-XML attribute information and adding the modified non-XML attribute information to a message under construction.

20. The method of claim 19, wherein the first translation map defines a format of the XML attribute in the XML information; and
   wherein modifying the non-XML attribute information comprises formatting the non-XML attribute information based on the format of the XML attribute in the first translation map from a non-XML information system to an XML information system.

21. The method of claim 18, wherein translating the XML attribute information using the second translation map from the XML information system to the at least one non-XML information system comprises modifying the XML attribute information and adding the modified XML attribute information to a message under construction.

22. The method of claim 18, wherein creating non-XML message comprises packaging the non-XML message.

23. The method of claim 22, wherein packaging the non-XML message comprises packaging the non-XML message as a queued message.

24. The method of claim 18, wherein sending the non-XML message to the determined non-XML information system comprises depositing the non-XML message on a queue for the determined non-XML information system.

25. A system for translating between hierarchical and non-hierarchical information systems, the system comprising logic for:
   providing a first translation map that identifies organization and content based rules for translating information from a non-hierarchical information system to an hierarchical information system based on at least one attribute;
   providing a second translation map that identifies organization and content based rules for translating information from an hierarchical information system to at least one non-hierarchical information system based on at least one attribute;
   receiving non-hierarchical information;
   determining non-hierarchical attribute information from the non-hierarchical information based on the first translation map;
   translating the non-hierarchical attribute information to create hierarchical information based on the first translation map;
   determining, between at least two non-hierarchical information systems, which non-hierarchical information system to send a message;
   determining hierarchical attribute information from the hierarchical information based on the second translation map;
   creating non-hierarchical message by translating the hierarchical attribute information using the second translation map; and
   sending the non-hierarchical message to the determined non-hierarchical information system.

26. The system of claim 25, wherein the logic for translating the non-hierarchical attribute information to create hierarchical information based on the first translation map comprises logic for modifying the non-hierarchical attribute information and adding the modified non-hierarchical attribute information to a message under construction.

27. The system of claim 26, wherein the first translation map defines a format of the attribute in the hierarchical information; and
   wherein the logic for modifying the non-hierarchical attribute information comprises logic for formatting the non-hierarchical attribute information based on the format of the attribute in the first translation map.

28. The system of claim 25, wherein the logic for translating the hierarchical attribute information using the second translation map comprises logic for modifying the hierarchical attribute information and adding the modified hierarchical attribute information to a message under construction.

29. The system of claim 25, wherein the logic for creating non-hierarchical message comprises logic for packaging the non-hierarchical message.

30. The system of claim 25, wherein the logic for sending the non-hierarchical message to the determined non-hierarchical information system comprises logic for depositing the non-hierarchical message on a queue for the determined non-hierarchical information system.

31. A method of translating between XML and non-XML information systems comprising:
   providing a translation map that identifies organization and content based rules for translating information from an XML information system to at least one non-XML information system based on at least one attribute;
   receiving XML information;
   determining, between at least two non-XML information systems, which non-XML information system to send a message;
   determining attribute information from the XML information based on the translation map;
   creating non-XML information based on translating the attribute information using the translation map; and
   sending the non-XML information to the determined non-XML information system.

32. The method of claim 31, wherein translating the attribute information using the translation map comprises modifying the attribute information and adding the modified attribute information to a message under construction.

33. The method of claim 32, wherein the translation map defines a format of the attribute in the non-XML information; and
   wherein modifying the attribute information comprises formatting the attribute information based on the format of the attribute in the translation map.

34. The method of claim 31, wherein creating non-XML message comprises packaging the non-XML message.

35. The method of claim 34, wherein packaging the non-XML message comprises packaging the non-XML message as a queued message.

36. The method of claim 31, wherein sending the non-XML message to the determined non-XML information system comprises depositing the non-XML message to a queue for the determined non-XML information system.

37. A system for translating between hierarchical and non-hierarchical information systems, the system comprising logic for:
   providing a translation map that identifies organization and content based rules for translating information from an hierarchical information system to at least one non-hierarchical information system based on at least one attribute;
   receiving hierarchical information;
   determining, between at least two non-hierarchical information systems, which non-hierarchical information system to send a message;
   determining attribute information from the hierarchical information based on the translation map;
   creating non-hierarchical information based on translating the attribute information using the translation map; and
   sending the non-hierarchical information to the determined non-hierarchical information system.

38. The method of claim 37, wherein the logic for translating the attribute information using the translation map comprises logic for modifying the attribute information and adding the modified attribute information to a message under construction.

39. The method of claim 37, wherein the logic for creating non-hierarchical message comprises logic for packaging the non-hierarchical message.

40. The method of claim 39, wherein the logic for packaging the non-hierarchical message comprises logic for packaging the non-hierarchical message as a queued message.

* * * * *